United States Patent [19]
Sakabe et al.

[11] Patent Number: 4,652,967
[45] Date of Patent: Mar. 24, 1987

[54] MONOLITHIC CERAMIC CAPACITOR

[75] Inventors: Yukio Sakabe, Funai; Shintaro Karaki, Takefu; Kiyoshi Nakano, Yawata, all of Japan

[73] Assignee: Murata Manufacturing Co., Ltd., Japan

[21] Appl. No.: 831,359

[22] Filed: Feb. 20, 1986

[30] Foreign Application Priority Data

Feb. 21, 1985 [JP] Japan .................................. 60-33777

[51] Int. Cl.$^4$ ........................ H01G 1/14; H01G 4/10; H01G 7/00
[52] U.S. Cl. .................................. 361/309; 29/25.42; 361/321
[58] Field of Search ............... 29/25.42; 361/320, 321, 361/306, 308, 309, 310; 264/61; 252/521; 501/134–138

[56] References Cited

U.S. PATENT DOCUMENTS 3,965,552  6/1976  Rutt ................................ 361/321 X
4,458,294  7/1984  Womack ............................ 361/321
4,584,629  4/1986  Garcia et al. .................. 29/25.42 X

FOREIGN PATENT DOCUMENTS 2103422  2/1983  United Kingdom ................ 361/321

Primary Examiner—Donald A. Griffin
Attorney, Agent, or Firm—Ostrolenk, Faber, Gerb & Soffen

[57] ABSTRACT

A monolithic ceramic capacitor, comprising a ceramic body, a plurality of internal electrodes of lead or lead alloy which are formed in said ceramic body in such a manner that adjacent two internal electrodes interpose a ceramic layer of the ceramic body, and a pair of external electrodes which are formed on both opposite end planes of the ceramic body and are connected to alternate internal electrodes, respectively, being characterized in that said external electrode comprises a first layer and a second layer which do not react with the internal electrode, that the first porous layer is connected to alternate internal electrodes, and that the second layer is formed on the first layer so as to cover the first layer and is made of silver, copper or nickel or its alloy.

A manufacturing method of a monolithic ceramic capacitor, comprising the steps of: (1) making a sintered ceramic body in which a plurality of voids are formed, said voids each being opened to either one end plane of the ceramic body, (2) applying a first porous layer on each of opposite end planes of said ceramic body, (3) dipping said ceramic body into molten lead or lead alloy, (4) introducing molten lead or lead alloy through said first layers into each of said voids to form internal electrodes therein, and (5) applying a second layer on each first layer so as to cover it.

6 Claims, 10 Drawing Figures

MONOLITHIC CERAMIC CAPACITOR

FIELD OF THE INVENTION

The present invention relates to an improvement of the structure of monolithic ceramic capacitor wherein internal electrodes are formed by filling in molten lead or lead alloy in the voids prepared beforehand in a ceramic body.

PRIOR ART

FIG. 1 shows a section of an example of a prior art monolithic ceramic capacitor, which has a plurality of internal electrodes 3 and a pair of external electrodes 4, 5 for taking out the electrostatic capacitance. The internal electrodes 3 are interposed by ceramic layer 2, while the external electrodes 4, 5 are each connected to the prescribed internal electrodes 3.

The monolithic ceramic capacitor 1 can be manufactured as follows: First, ceramic green sheets of thickness, say from fifty to one hundred micrometers, are prepared. Next, paste including carbon powder is printed on each of the ceramic green sheets. Then, a plurality of ceramic green sheets are stacked and fired so that the carbon powder burns and vanishes. As a result, voids are formed in the places where the paste is printed. Further, silver paste is applied onto both end surfaces of the ceramic body 2 and baked to form porous silver layers which serves as the external electrodes 4, 5. Then, a chip prepared in this way is dipped under reduced pressure in a molten lead bath of about 330° to 360° C., and then, the space above the molten lead is pressurized so as to fill molten lead in the voids remained in the ceramic body 2. Next, the chip immersed in the molten lead bath is taken out and cooled down, and the pressure is reduced to ambient pressure. Thus, the internal electrodes 3 of lead have been formed in the voids. A monolithic ceramic capacitor manufactured in this way is cheap because cheap base metal such as lead can be used for the internal electrodes 3.

In the above-mentioned manufacturing method of monolithic ceramic capacitor 1, porous silver layers as the external electrodes 4, 5 should be formed before the permeation of the internal electrodes 3; otherwise even if the pressure of the molten lead bath from the reduced pressure state through the pressurized state to the ambient pressure state is controlled, the leak of the molten lead from the voids can not be prevented when the chip is taken out from the molten lead bath.

However, the above-mentioned manufacturing method has following disadvantages: When a multilayer chip is immersed in the molten lead bath, silver is disolved in the molten lead bath and the external electrodes 4, 5 vanish or are eaten because they are made of porous silver. Therefore, the leak of molten lead from the voids cannot be prevented. Further, when a Pb-Ag alloy layer is formed in the external electrodes 4, 5 due to the leak of molten lead, the soldering in a following process for the connection of the external electrodes 4, 5 to a print circuit board or a lead wire becomes difficult.

SUMMARY OF THE INVENTION

An object of the present invention is to provide a monolithic ceramic capacitor which has good soldering properties upon mounting it, for example, on a print circuit board.

Another object of the present invention is to provide a manufacturing method of a monolithic ceramic capacitor according to which external electrodes can be maintained not to be deteriorated or not to be eaten during the filling process of molten lead.

A monolithic ceramic capacitor according to the present invention comprises a ceramic body, a plurality of internal electrodes of lead or lead alloy which are formed in said ceramic body in such a manner that adjacent two internal electrodes interpose a ceramic layer of the ceramic body, and that a pair of external electrodes which are formed on both opposite end planes of the ceramic body and are connected to alternate internal electrodes, respectively, and it is characterized in that said external electrode comprises a first layer and a second layer each made of a material which does not react with the internal electrodes, that the first layer is connected to alternate internal electrodes and is made of a porous material, and that the second layer is formed on the first layer so as to cover the first layer and is made of a material which makes good contact with solder.

A manufacturing method of a monolithic ceramic capacitor according to the present invention comprises the steps of (1) making a sintered ceramic body in which a plurality of voids are formed, said each void being opened to either end plane of the ceramic body so as to introduce lead or lead alloy forming an internal electrode, (2) applying a first layer on each of opposite end planes of said ceramic body, said first layer being made of a porous material which does not react with said lead or lead alloy, (3) dipping said ceramic body into molten lead or lead alloy and introducing molten lead or lead alloy through said first layers into each of said voids to form internal electrodes therein, and (4) applying a second layer on each first layer so as to cover it, said second layer being made of a material which makes good contact with solder.

An advantage of a monolithic ceramic capacitor according to the present invention is that a second layer applied on a first layer of an external electrode improves the adhesion with solder because it consists of silver, copper or nickel, or its alloy.

An advantage of manufacturing method of a monolithic ceramic capacitor according to the present invention is that a first layer of an external electrode is not liable to vanish or to be eaten by the molten lead or lead alloy because nickel as a main component of the first layer does not react with lead or lead alloy.

BRIEF EXPLANATION OF THE DRAWINGS

The invention is illustrated diagramatically in the following drawings wherein.

DESCRIPTION OF PREFERRED EMBODIMENT

Figure 1:
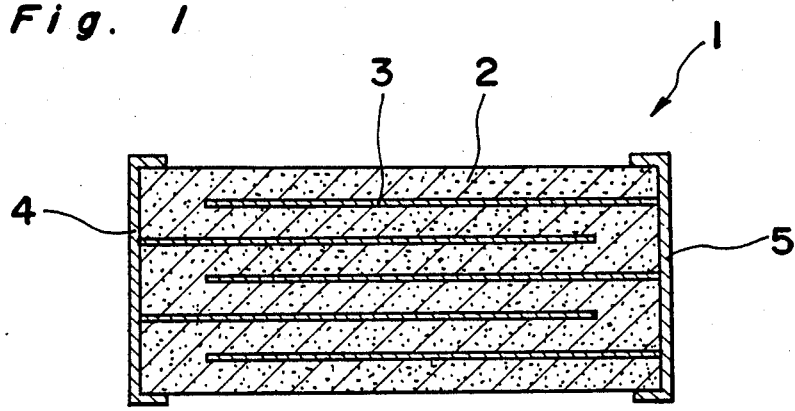
FIG. 1 is a sectional view of a prior art monolithic ceramic capacitor.
Figure 2:
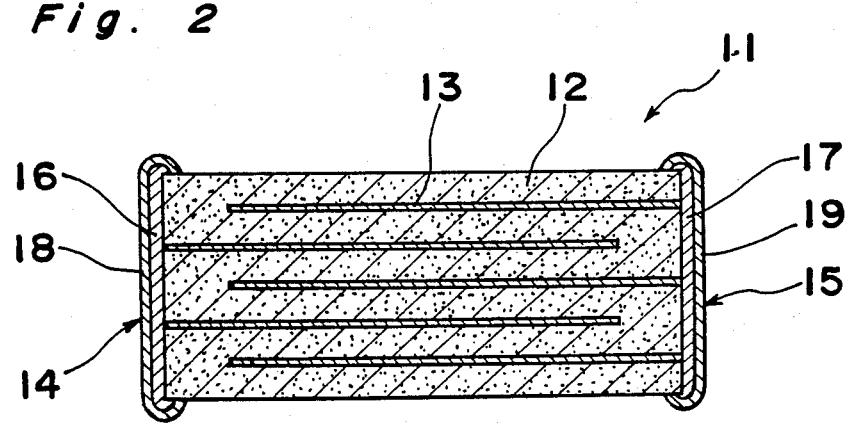
FIG. 2 is a sectional view of an embodiment according to the present invention, and FIG. 3 (a)–(h) are diagrams which show the successive steps of a manufacturing method of a monolithic ceramic capacitor according to the present invention.

FIG. 2 shows a section of a monolithic ceramic capacitor 11 of an embodiment according to the present invention. A plurality of internal electrodes 13 are layered by interposing ceramic material 12. A pair of external electrodes 14, 15 for taking out the electrostatic capacitance are each put on both end surfaces of the ceramic material 12, and are connected to alternate internal electrodes 13. The internal electrodes 13 are produced by the permeation of molten lead or lead alloy, similarly to the counterparts of a prior art monolithic ceramic capacitor 1 shown in FIG. 1. The external electrodes 14, 15 comprise first layers 16, 17 and second layers 18, 19, respectively. The first layers 16, 17 are made of a material containing nickel as a main component, while the second ones 18, 19 are made of silver, copper or nickel. The first layers 16, 17 are formed before the permeation of molten lead or lead alloy, while the second ones 18, 19 are prepared with electroplating, vacuum deposition or sputtering after the formation of the internal electrodes 13 by the permeation of lead or lead alloy.

The first layers 16, 17 may include other components such as boron and zinc besides nickel. The second ones 18, 19 may include other components besides silver, copper or nickel. In an embodiment shown in FIG. 2, the first layers 16, 17 of the external electrodes 14, 15 consist mainly of nickel which does not react with lead or lead alloy. Therefore, the first layers 16, 17 and molten lead do not react with each other when molten lead is permeated into the voids so as to form the internal electrodes 13. In other words, the external electrodes 14, 15 do not vanish or are not eaten on the permeation. Further, the second layers 18, 19 consist mainly of silver, copper or nickel so that a monolithic ceramic capacitor 11 can be soldered in a good contact state.

The method according to the present invention will be described below.

Figure 3A:
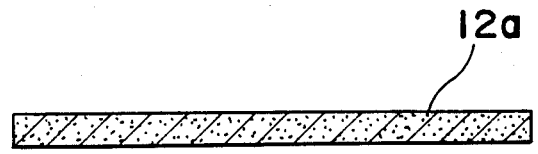
Figure 3B:
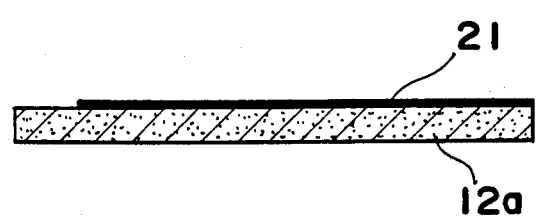
Figure 3C:
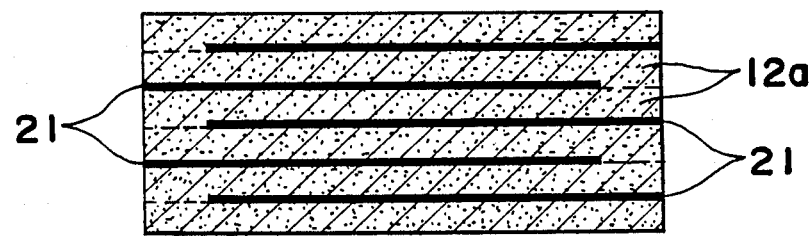
Figure 3D:
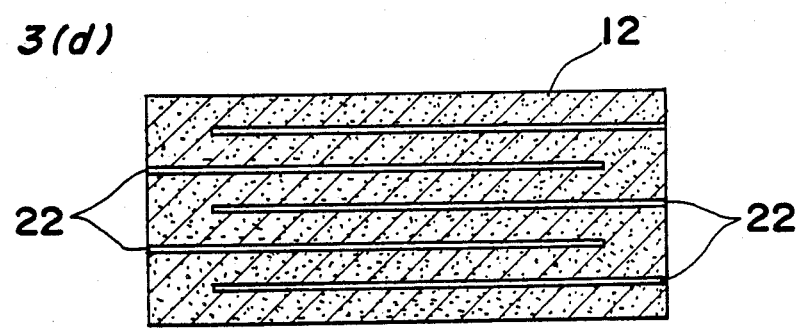
Figure 3E:
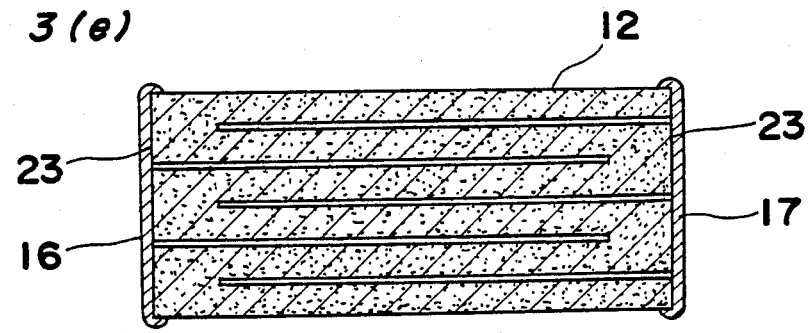

Ceramic green sheets 12a are prepared first (FIG. 3(a)). Paste 21 made from 70-95 wt % carbon powder and 5-30 wt % ceramic powder is printed on ceramic green sheets 12a, in detail, on the places where the internal electrodes 13 should be formed (FIG. 3(b)). A plurality of ceramic green sheets 12a thus processed are stacked and pressed to make them contact with each other (FIG. 3(c)). Next, they are heated up to 1300° C. at a rate of 200° C./hr, kept at 1300° C. for two hours so as for said paste to be fired, and, then, are allowed to cool down (FIG. 3(d)). In a sintered chip thus produced, the carbon powder printed in the spaces for the internal electrodes vanishes, and porous voids 22 are left wherein the ceramic crystal grains array columnarly inside the sintered chip. Then, paste made from $Ni_3B$ and borosilicate lead glass frit is painted on end faces 23 of the sintered chip where the external electrodes should be formed, and the sintered chip thus processed is baked at 600° C. under ambient environment (FIG. 3(e)). The first layers 16, 17 produced in this way are porous.

Comparison 1 is prepared by applying paste made from silver and borosilicate lead glass frit on the end planes for the external electrodes and by baking the chip at 800° C. under ambient environment, while Comparison 2 is prepared by applying paste made from Ag-Pd and borosilicate lead glass frit on the end planes and by baking the chip at 850° C. under ambient environment.

Figure 3F:
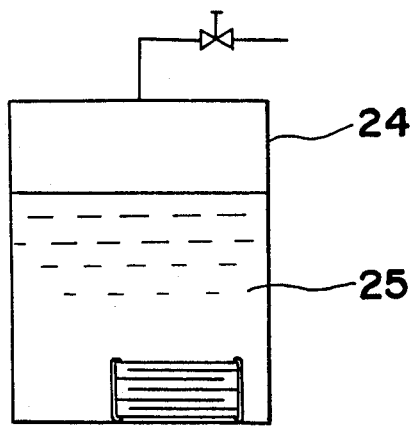

The sintered chips of the embodiment and Comparison 1 and 2 applied with different pastes are put in a high pressure container 24 wherein molten lead 25 is filled, and the pressure of the container 24 is reduced to 2-10 mmHg at first. Then, they are dipped in molten lead 25, and the container 24 is pressurized at a pressure of 10-15 atmospheric pressure during a period of five seconds to two minutes by using nitrogen gas in order to prevent the oxidation of the molten lead 25 (FIG. 3(f)).

Figure 3G:
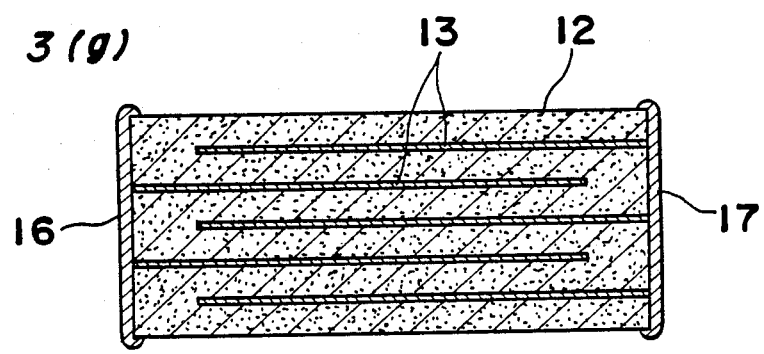
Figure 3H:
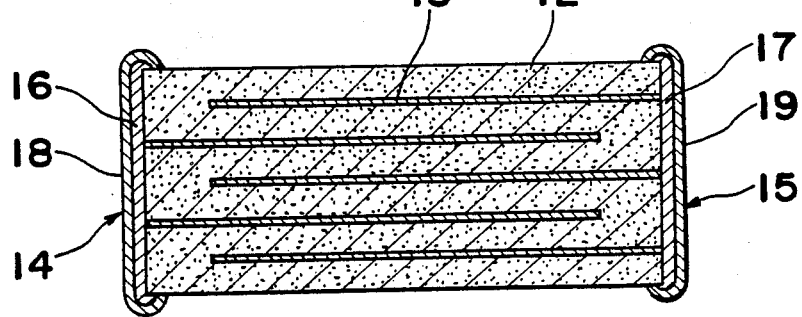

Next, the chips are taken out from the molten lead 25 and are allowed to cool down to a temperature where the lead solidifies. Then, the pressure is reduced to ambient pressure, and the chips are taken out from the high pressure container 25 (FIG. 3(g)).

A following table shows the residual area ratio (%) of the first layers 16, 17 of this embodiment and Comparisons 1 and 2 when the time of the dip in molten lead 25 is varied.

TABLE

| dip time (sec) | invention ($Ni_3B$) | Comparison 1 (Ag) | comparison 2 (Ag—Pd) |
|---|---|---|---|
| 5 | 100% | 5-15% | 50-90% |
| 10 | 100% | 0 | 0-20% |
| 20 | 100% | 0 | 0 |
| 30 | 100% | — | — |
| 60 | 100% | — | — |
| 120 | 100% | — | — |

In comparisons 1 and 2 which are prepared by using Ag and Ag-Pd paste, respectively, there have been lost the external electrodes for longer dip times, whereas in this embodiment according to the present invention prepared by using $Ni_3B$, the complete external electrodes have been kept even for the dip time of two minutes.

A chip of this embodiment wherein the internal electrodes have been prepared as mentioned above is masked with a metallic jig except the first layers 16, 17 of the external electrodes 14, 15 and is set in a vacuum chamber of a sputtering apparatus. The second layers 18, 19 of the external electrodes 14, 15 are formed by the sputtering of a plate of silver, copper or nickel as a target during fifteen minutes under a pressure of $10^{-2}$ to $10^{-4}$ Torr.

A monolithic ceramic capacitor of this embodiment has the structure of external electrodes which are easy to solder lead wires and prevent the eating on the soldering. In other words, the quality of the soldering is improved.

Further, the second layers 18, 19 of the external electrodes 14, 15 can also be prepared by conventional vacuum deposition or electroplating process, and they have good quality of the soldering.

Molten lead for the permeation of the internal electrodes can be replaced by molten lead alloy with low melting point.

While the embodiments of the present invention, as herein disclosed, constitute a preferred form, it is to be understood that other forms might be adopted.

What is claimed is:

1. A monolithic ceramic capacitor, comprising a ceramic body, a plurality of internal electrodes of lead or lead alloy which are formed in said ceramic body in such a manner that adjacent two internal electrodes interpose a ceramic layer of the ceramic body, and a pair of external electrodes which are formed on both opposite end planes of the ceramic body and are connected to alternate internal electrodes, respectively, being characterized in that said external electrode comprises a first layer and a second layer which do not react with the internal electrodes, that the first layer is connected to alternate internal electrodes and is made of a porous material which contains nickel as a main component and that the second layer is formed on the first layer so as to cover the first layer and is made of silver, copper or nickel, or an alloy thereof, said first layer being made of a material prepared by baking a paste which includes $Ni_3B$.

2. A manufacturing method of making a monolithic ceramic capacitor, comprising the steps of:
  making sintered ceramic body in which a plurality of voids are formed, said voids each being so opened to either one end plane of the ceramic body as to introduce lead or lead alloy forming an internal electrode;
  applying a first layer on each of opposite end planes of said ceramic body, said first layer being a porous material which is prepared by baking a paste including $Ni_3B$:
  dipping said ceramic body into molten lead or lead alloy and introducing molten lead or lead alloy through said first layers into each of said voids to form internal electrodes therein; and
  applying a second layer on each first layer so as to cover it, said second layer being made of a material which makes good contact with solder.

3. A manufacturing method of a monolithic ceramic capacitor according to claim 2, wherein said step of producing of a sintered ceramic body comprises the steps of:
  producing a plurality of ceramic green sheets;
  applying paste made mainly from carbon powder on the ceramic green sheets;
  stacking the ceramic green sheets to form a ceramic body; and
  sintering the ceramic body.

4. A manufacturing method of a monolithic ceramic capacitor according to claim 2, wherein said second layers are made of silver, copper or nickel.

5. A manufacturing method of a monolithic ceramic capacitor according to claim 2, wherein said second layers are made of an alloy which contains silver, copper or nickel.

6. A manufacturing method of a monolithic ceramic capacitor according to claim 5, wherein said second layers are prepared with the sputtering process, the vacuum deposition process or the electroplating process.

* * * * *